UNITED STATES PATENT OFFICE.

HENRY PHELPS GAGE AND WILLIAM CHITTENDEN TAYLOR, OF CORNING, NEW YORK, ASSIGNORS TO CORNING GLASS WORKS, OF CORNING, NEW YORK, A CORPORATION OF NEW YORK.

GLASS.

1,305,794.  Specification of Letters Patent.  Patented June 3, 1919.

No Drawing. Original application filed May 28, 1918, Serial No. 237,108. Divided and this application filed October 14, 1918. Serial No. 258,056.

*To all whom it may concern:*

Be it known that we, HENRY PHELPS GAGE, a citizen of the United States of America, and a resident of Corning, New York, and WILLIAM CHITTENDEN TAYLOR, a citizen of the United States of America, and a resident of Corning, New York, have jointly invented certain new and useful Improvements in Glass, of which the following is a specification.

Our invention relates to a glass which has high transmission for the ultra-violet rays while absorbing practically all of the visible light, and which is useful for certain purposes where such a glass is desirable. The present application is filed in response to a requirement of the Patent Office as a division of our prior application filed May 28, 1918, Serial No. 237,108, for glass.

In making our improved glass, we make use of our discovery that oxid of nickel (NiO) when melted in a suitable batch in proportions of from ½ to 12 per cent. of the total, gives a glass having the properties desired. If, however, certain ingredients are present in the glass in substantial proportions, the desired results are not obtained to the highest extent. Among the undesirable ingredients are lime, magnesia, lead oxid, alumina, and boric acid. Either soda or potash can be used as the alkali, while, in the present instance, zinc oxid is used as the base.

The following are compositions of zinc oxid glass illustrative of this invention:—

|        | (1)   | (2)   | (3)   | (4)   |
|--------|-------|-------|-------|-------|
| $SiO_2$ | 53.0% | 60.0% | 60.0% | 68.0% |
| $K_2O$  | 20.0  | 22.5  |       |       |
| $Na_2O$ |       |       | 13.8  | 15.5  |
| $ZnO$   | 15.0  | 17.0  | 14.2  | 16.0  |
| $NiO$   | 12.0  | 0.5   | 12.0  | 0.5   |

It will be noted that as shown by the above formula, a considerable variation in the percentage of nickel is permissible, it being understood that glasses containing small amounts of nickel transmit extreme red and infra-red, as well as ultra-violet, but glasses high in nickel transmit only ultra-violet. The amount of infra-red transmitted varies therefore with the amount of nickel and the thickness of the glass.

Having thus described our invention, we claim:—

1. A zinc glass containing from ½% to 12% nickel oxid.

2. A glass composed of potassium-zinc-silicate colored with oxid of nickel.

3. A glass essentially consisting of an alkali-zinc-silicate colored with oxid of nickel.

In testimony whereof, we have hereunto set our hands this 12th day of October 1918.

HENRY PHELPS GAGE.
WILLIAM CHITTENDEN TAYLOR.